US009756395B1

(12) United States Patent
Kilbourn et al.

(10) Patent No.: US 9,756,395 B1
(45) Date of Patent: Sep. 5, 2017

(54) CONTENT RATING AND CONTROL

(75) Inventors: Timothy Kilbourn, Mountain View, CA (US); Pei-Keng Chen, Mountain View, CA (US); Michael Marchak, San Jose, CA (US); David P. Conway, Los Altos, CA (US); Cassandra Forsyth, San Francisco, CA (US); Peisun Wu, Mountain View, CA (US); Paul Montoy-Wilson, Palo Alto, CA (US); Anita Mhaskar, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 99 days.

(21) Appl. No.: 13/423,346

(22) Filed: Mar. 19, 2012

(51) Int. Cl.
*H04N 21/475* (2011.01)
*G06F 17/30* (2006.01)

(52) U.S. Cl.
CPC ... *H04N 21/4756* (2013.01); *G06F 17/30749* (2013.01); *G06F 17/30817* (2013.01)

(58) Field of Classification Search
CPC .......... H04N 21/4756; G06F 17/30749; G06F 17/30817
USPC ......................................................... 725/28
See application file for complete search history.

(56) References Cited

U.S. PATENT DOCUMENTS

| | | | |
|---|---|---|---|
| 7,472,424 B2 | 12/2008 | Evans et al. | |
| 2002/0053077 A1* | 5/2002 | Shah-Nazaroff | H04H 60/33 725/13 |
| 2003/0103627 A1 | 6/2003 | Nierzwick et al. | |
| 2004/0261093 A1* | 12/2004 | Rebaud | G06F 21/10 725/25 |
| 2005/0097595 A1* | 5/2005 | Lipsanen | G06F 21/10 725/25 |
| 2007/0179835 A1* | 8/2007 | Ott | G06Q 30/02 705/306 |
| 2007/0233701 A1* | 10/2007 | Sherwood | G06F 17/30029 |
| 2007/0260603 A1 | 11/2007 | Tuscano et al. | |
| 2008/0040748 A1 | 2/2008 | Miyaki | |
| 2008/0182587 A1* | 7/2008 | Bennett | H04W 4/02 455/456.2 |
| 2008/0304808 A1* | 12/2008 | Newell | G06F 17/30029 386/278 |

(Continued)

OTHER PUBLICATIONS

Android Market Ratings overview.

*Primary Examiner* — Nathan Flynn
*Assistant Examiner* — Tung T Trinh
(74) *Attorney, Agent, or Firm* — Morris & Kamlay LLP

(57) ABSTRACT

Systems and methods are disclosed for restricting access to content elements with content ratings. In one method, the content distributor can receive a request from a device to access a set of content elements. The content distributor can then identify at least a content descriptor and a content rating for each content element within the set of content elements, identify a range within the content ratings, and identify content elements with content ratings that are within the range. The content distributor can transmit at least the content descriptors for content elements having content ratings that are within the range to the device for display on the device. This permits a device user to access the content elements by content descriptor. In this method, at least some content descriptors for content elements having content ratings that are outside of the range are not transmitted to the device.

22 Claims, 5 Drawing Sheets

(56) References Cited

U.S. PATENT DOCUMENTS

| | | |
|---|---|---|
| 2009/0234857 A1 | 9/2009 | Barault et al. |
| 2009/0299824 A1* | 12/2009 | Barnes, Jr. .......... G06F 3/04847 705/7.39 |
| 2011/0035768 A1 | 2/2011 | Ling et al. |

* cited by examiner

CONTENT RATING AND CONTROL

TECHNICAL FIELD

The present disclosure relates to controlling distribution of applications and other content from content distributors to remote devices such as mobile telephones.

BACKGROUND

Handheld computing devices (devices) such as the mobile telephone have proliferated in recent years. These devices are equipped with processors, memory, and the capability to communicate through local and wide area networks, including the Internet. These devices are equipped with operating systems, which permit the devices to execute a wide range of computer programs, typically called applications, or "apps." The device user can download applications and other content by direct communication with a content server through a mobile phone network or wireless local area network. The operating systems all have a wide variety of applications and other content available. At least some of the applications and content can be objectionable to some device users or parents of device users.

Applications and other content can be rated for maturity level with content ratings. These content ratings can be displayed with applications and other content by the content distributor. Controls can be enabled that prohibit device users from downloading or using applications and other content displayed to the device user by the content distributors with content ratings outside of a certain range. However, this type of control can be insufficient to protect some users from objectionable content.

SUMMARY

Systems and methods for distributing content are disclosed. In one implementation, a method is disclosed for restricting access to a set of content elements with content ratings by a content distributor. The method includes receiving a request from a device to access a set of content elements, identifying at least a content descriptor and a content rating for each content element within the set of content elements, identifying a range within the content ratings, identifying content elements with content ratings that are within the range, and transmitting at least the content descriptors for content elements having content ratings that are within the range to the device for display on the device to permit a device user to access the content elements by content descriptor. In this method at least some content descriptors for content elements having content ratings that are outside of the range are not transmitted to the device.

In another implementation, a system is disclosed for restricting access to a set of content elements with content ratings by a content distributor. The system includes a content server in communication with a network with the network in communication with a device. The content server includes a processor for controlling the operations of the content server and a memory for storing data and program instructions used by the processor. The processor is configured to execute instructions stored in the memory to receive a request from the device to access a set of content elements, identify at least a content descriptor and a content rating for each content element within the set of content elements, identify a range within the content ratings, identify content elements with content ratings that are within the range, and transmit at least the content descriptors for content elements having content ratings that are within the range to the device for display on the device to permit a device user to access the content elements by content descriptor. In this system, content descriptors for content elements having content ratings that are outside the range are not transmitted to the device.

In another implementation, a method is disclosed for a device to restrict access to a set of content elements with content ratings. The method includes sending a request to a content server to access a set of content elements. The content server identifies at least a content descriptor and a content rating for each content element within the set of content elements, identifies a range within the content ratings, identifies content elements with content ratings that are within the range, and transmits at least the content descriptors for content elements having content ratings that are within the range to the device for display on the device. The method further includes receiving at least some content descriptors wherein at least some content descriptors for content elements having content ratings that are outside of the range are not received by the device, rendering the received content descriptors on a display on the device, and accessing at least one content element by content descriptor.

BRIEF DESCRIPTION OF THE DRAWINGS

The description herein makes reference to the accompanying drawings wherein like reference numerals refer to like parts throughout the several views, and wherein.

DETAILED DESCRIPTION

In addition to maturity level, applications and other content can be rated by the amount of information sharing in the application or other content. Information sharing can include identifying device users, allowing communication between device users, accessing location data, and publishing the location of a device. Information sharing can expose a device user to other device users. This exposure is potentially dangerous when the device user is a child. Current systems for filtering content display information about applications or other content but block download or use by the device. The embodiments described here include controls that prohibit device users from seeing applications or other content with inappropriate maturity levels or with inappropriate information sharing features to better protect device users. Inappropriate material can be completely blocked because the device user cannot display any information about the applications or other content outside of a given range of content ratings.

Figure 1:
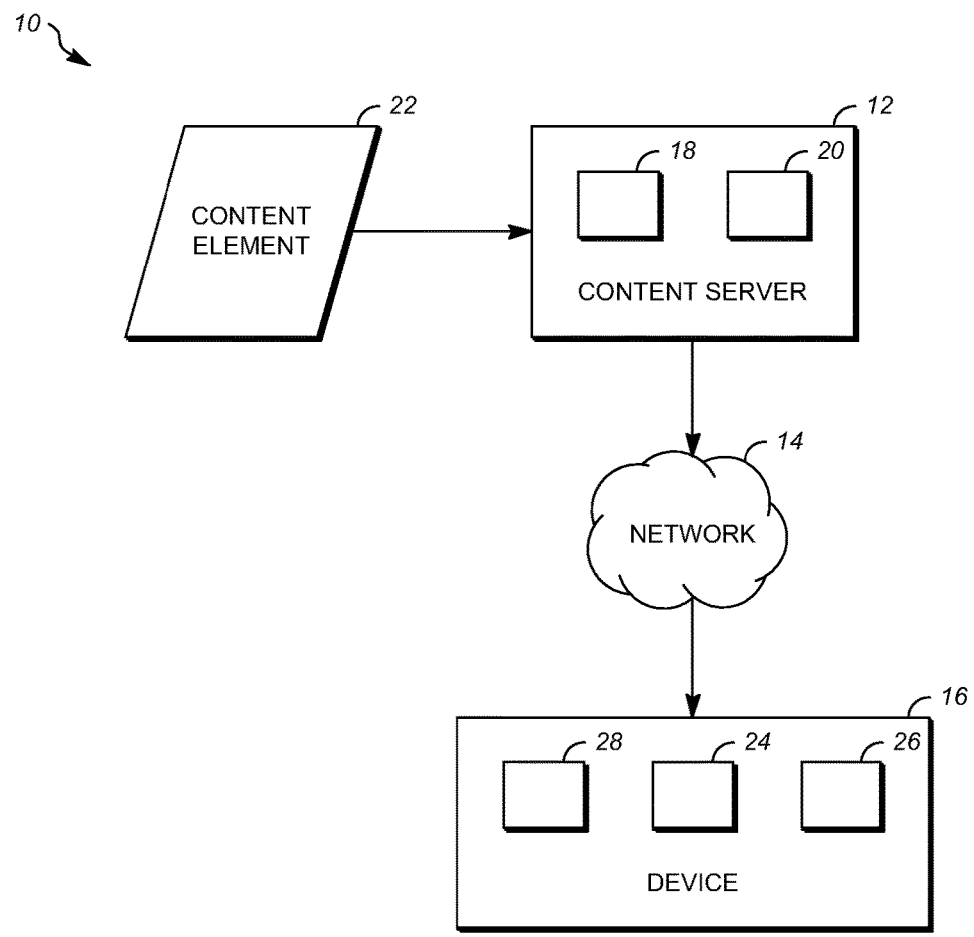
FIG. 1 is a block diagram of a system for distributing content.

FIG. 1 is a block diagram of a system 10 in accordance with one embodiment. The system 10 can include a content server 12, a network 14, and a device 16. The content server 12 can include one or more processors such as a central processing unit (CPU) 18 and a memory 20 such as random access memory (RAM). The memory 20 stores data and program instructions which are used by the CPU 18. In one embodiment, content elements 22 are resident on or otherwise accessible to the content server 12 (sometimes referred to as an application marketplace). A device 16 can communicate with the content server 12 over the network 14 to request access to the content elements 22 including applications, games or other software, music, images, video, or any other type of software or data which a device user may wish to view and download to the device 16 over the network 14. All such applications, software, and data are referred to here generically as "content elements."

The network 14 couples the content server 12 and device 16 for transferring information regarding content elements 22 between the content server 12 and device 16. The network 14, can, for example, be or include the Internet. The network 14 can also be or include a local area network (LAN), wide area network (WAN), virtual private network (VPN), wireless local area network such as one based on the IEEE 802.11 standards, or any other means of transferring information about the content elements 22 from the content server 12 to the device 16. Communication between the device 16 and content server 12 can also be based on any other suitable wireless standards such as 3G or 4G.

The device 16 can include one or more processors such as a CPU 24, a memory 26 such as RAM, and a display 28. The CPU 24 can control the operations of the device 16. The CPU 24 can be connected to the memory 26 by, for example, a memory bus. The memory 26 stores data and program instructions which are used by the CPU 24. The device 16 can be a laptop, notepad, personal digital assistant, tablet computer, smart phone, or other suitable device. The device 16 in this embodiment is a mobile telephone that is equipped with an operating system.

The display 28 is configured to present content elements 22 on the device 16 in a format suitable for visual review and selection. For example, a device user can view the content elements 22 by content descriptor on the display 28 and choose specific content elements 22 to download and save for future use by the device 16. Content descriptors include content title, content description, and/or other pieces of information that can describe the nature of the content element 22. In one embodiment, the display 28 can be integral with the device 16. In an alternate embodiment, the display 28 can be separate from and connected to the device 16 via a wired or wireless coupling such as a USB cable or a Bluetooth-enabled wireless connection. The display 28 can be implemented in various ways, including by a liquid crystal display (LCD) or a cathode-ray tube (CRT).

Figure 2:
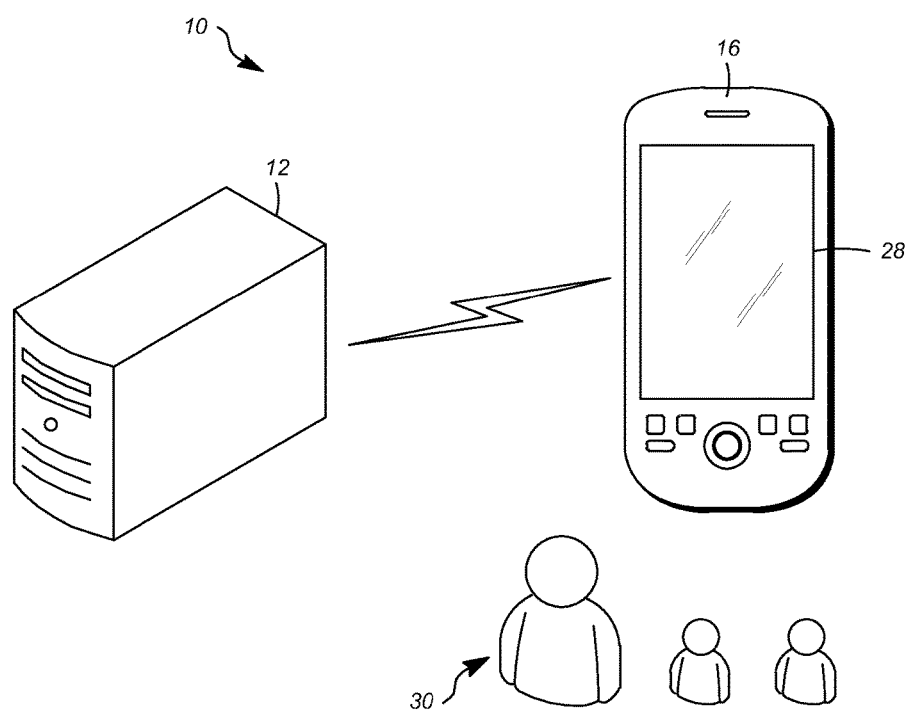
FIG. 2 is a schematic illustration of the use of the system depicted in FIG. 1.

FIG. 2 is a schematic illustration of the use of the system 10. A device user 30 of device 16, for example, a parent with children, can configure the device 16 to access only specific content elements 22 on at least one content server 12. In an exemplary embodiment, the device user 30 can run an application marketplace program on the device 16, allowing the device user 30 to access content elements 22. An application marketplace program acts, for example, as an online store offering device users 30 the ability to browse and download content elements 22 published by content providers. In an alternate embodiment, instead of a device user 30 configuring a device 16 to access content elements 22 on a content server 12, a third-party content distributor can establish a connection to the content server 12 and request access to content elements 22 for further distribution. The interaction between the third-party content distributor and at least one content server 12 of the content distributor can be similar to the interaction between the device 16 and content server 12. The third-party content distributor can be needed if, for example, device users 30 on carriers without a direct connection to the at least one content server 12 seek to access content elements 22 from the content distributor.

Once the device 16 is configured, the device user 30 can send a request from the device 16 to the content server 12 specifying that at least some content elements 22 be downloaded to the device 16. Such a request can specify the content elements 22 to be downloaded along with information identifying the device 16. Such a request can also include configuration information pertaining to the device 16. The configuration information can be supplied directly or indirectly by the device 16 during an initiation process in which the device user 30 establishes an account with the content server 12. Alternatively, the configuration information can be stored at the content server 12 or distributed across a third, remote location (not shown).

Before fulfilling the request from the device that at least some content elements 22 be downloaded to the device 16, the content server 12 can perform authentication or validation processing on the request to determine if it is appropriate to download the requested content elements 22 to the device 16. For example, the content server 12 can determine based on the configuration information whether the device 16 is capable of physically running the requested content elements 22, e.g., determining whether the device 16 is equipped with the hardware and software that is required to use the requested content elements 22. The content server 12 can also determine from the information contained in the request whether the request is authentic—that is, whether the request emanates from the individual authorized to request downloads of content elements 22 to the device 16. For example, the content server 12 can determine whether the telephone number or IP address assigned to the device 16 is authentic. The content server 12 can also perform a financial transaction associated with the requested content elements 22, such as charging a payment source that is previously stored at the content server 12 or directly on the device 16.

The operations of the content server 12 can be consolidated onto a single server. Alternatively, the functions of the content server 12 can be distributed across a number of different machines. Although illustrated for simplicity as a unitary machine, it is understood that the content server 12 of the system 10 is not necessarily implemented using a single processor or single physical machine. Further, the device user 30 can be more than one person and have more than one device 16 configured to access the content server 12. In an exemplary embodiment, multiple device users 30 can be a parent and two children each having mobile telephones on the same plan. The device user 30 can also provide different configurations to different devices 16. For example, a parent can configure the mobile telephones for each of their children to have different access to the content server 12 than the parent's device 16.

Figure 3:
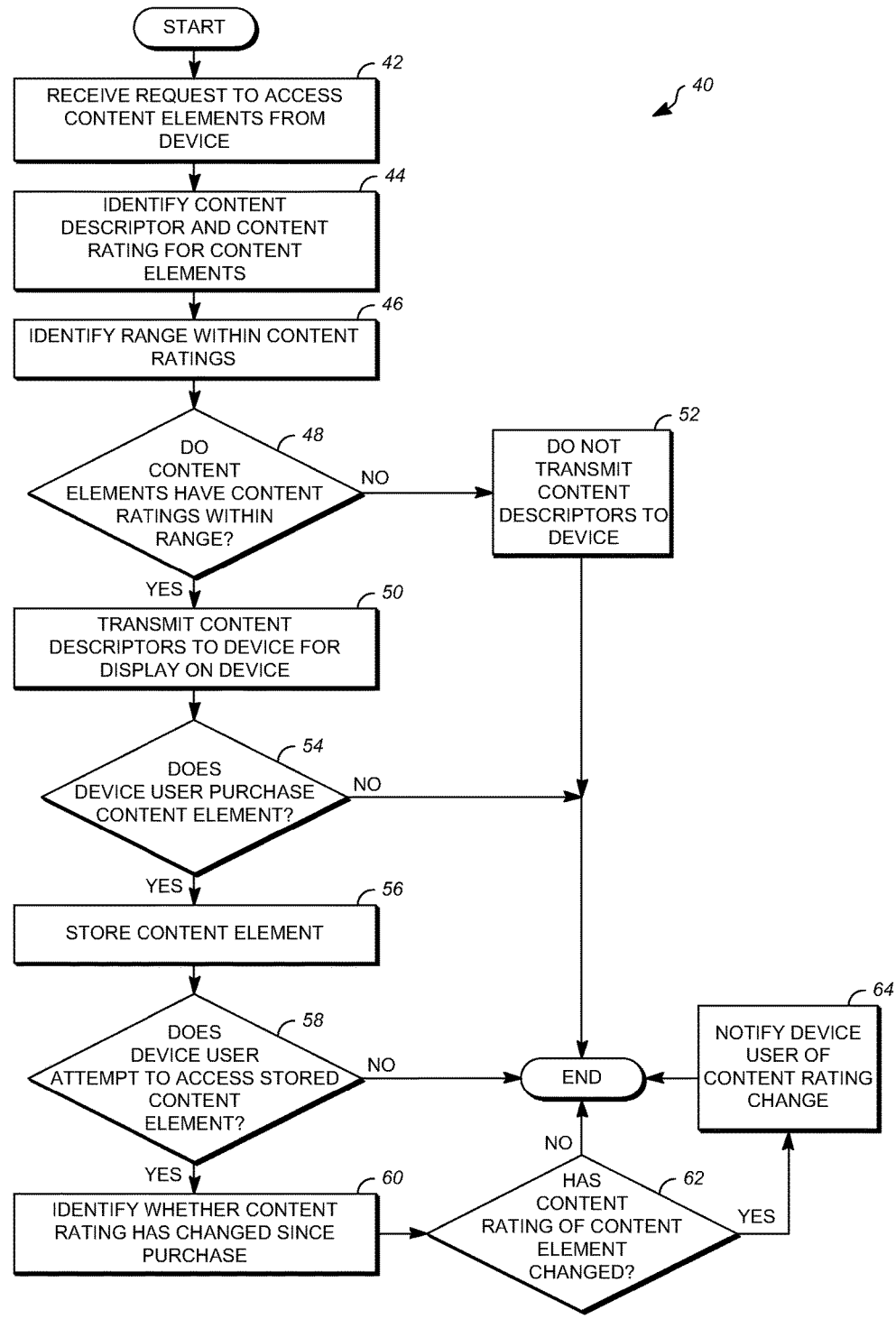
FIG. 3 is a logic flowchart of a process performed by one or more servers in the system of FIG. 1.
Figure 4:
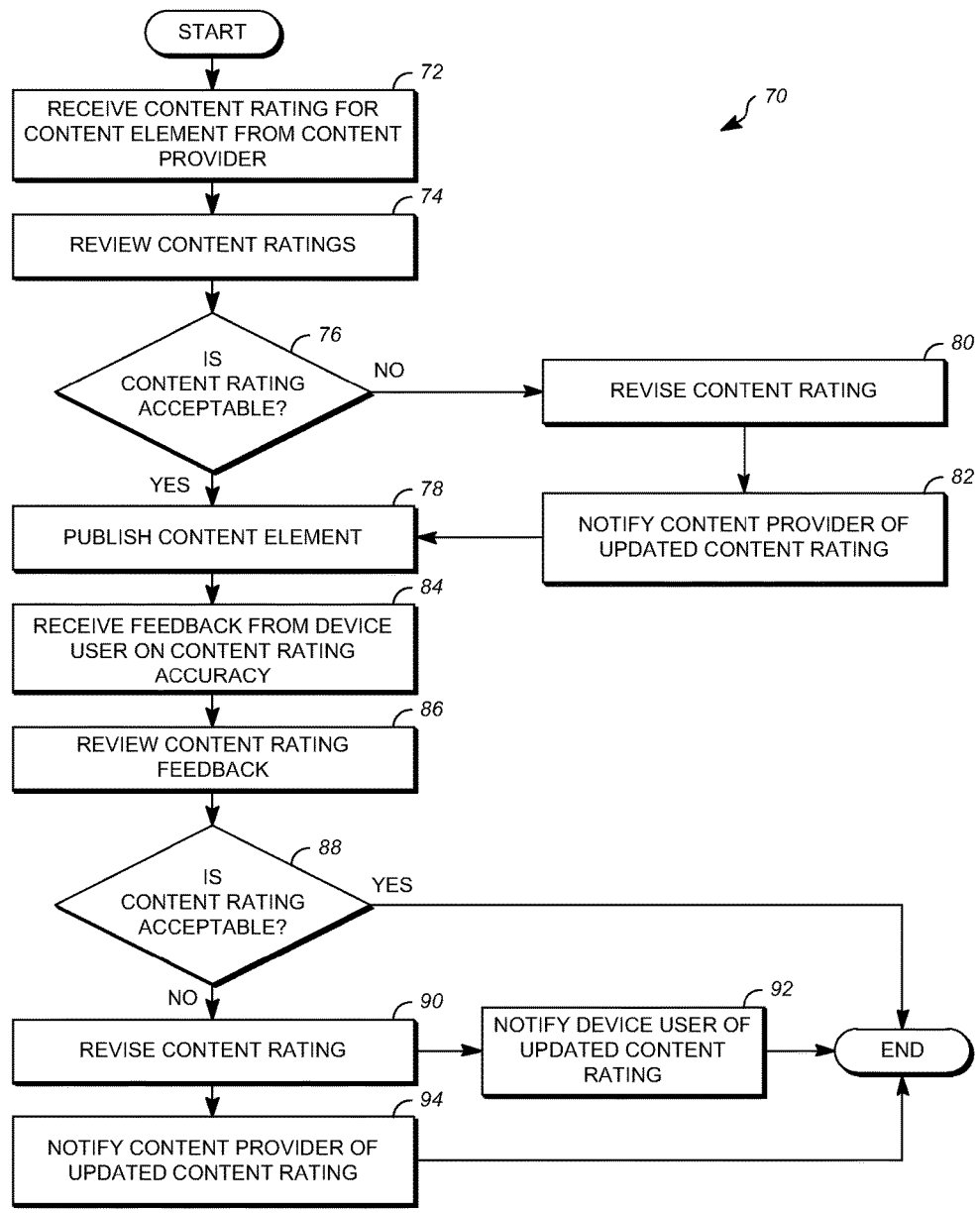
FIG. 4 is a logic flowchart of another process performed by one or more servers in the system of FIG. 1.
Figure 5:
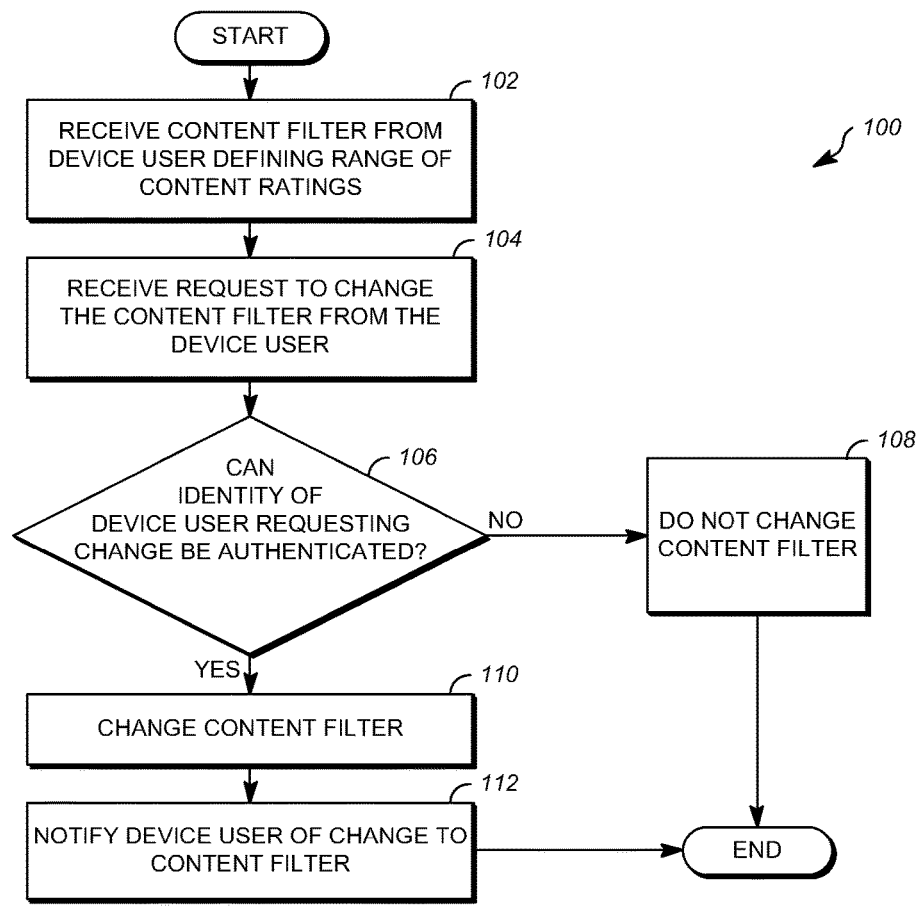
FIG. 5 is a logic flowchart of another process performed by one or more servers in the system of FIG. 1.

Referring to FIGS. 3-5, logic flowcharts are provided illustrating the process flows for the system 10 described above in more detail. FIG. 3 is a logic flowchart of a process 40 performed by the one or more content servers 12 in the system 10. Beginning at step 42, the content server 12 can receive a request to access content elements 22 from the device 16. The content elements 22 can each have content descriptors and content ratings reflecting the nature of the content and including such aspects as content title, content description, content maturity level, or information sharing capability of the content element 22. The content ratings, for example, can be supplied by the content provider or content distributor, as further described in FIG. 4. At step 44, the content server 12 identifies at least the content descriptor and content rating for each content element 22. This identification can allow the content elements 22 to be categorized by content rating and viewed by content descriptor. Next, at step 46, the content server 12 identifies a range within the content ratings. The range can indicate which content elements 22 will be available for access by the device 16. The range can be supplied, for example, by the device user 30 or the content distributor. The range can include a single content rating or a plurality of content ratings available for access by the device 16. An example of identifying the range is described in FIG. 5.

Once the range within the content ratings is identified, a determination is made as to whether each content element 22 in the set of content elements 22 has a content rating within the range at decision block 48. In an exemplary embodiment, determination that a content element 22 is within the range can be made by the content server 12 before allowing the device 16 to access the content elements 22 by content descriptor. The content server 12 can also make a determination whether the device 16 is capable of physically running the requested content element before allowing the device 16 to access the content element 22 by content descriptor. If the content elements 22 are determined to be within the range and are capable of being run on the device 16, the content server 12 can transmit at least the content descriptors of the content elements 22 in the range to the device 16 for display on the device 16 at step 50. Alternately, if the content elements 22 are determined to be outside of the range, the content server 12 will not transmit information related to the content elements 22 to the device 16 as shown at step 52. By making the determination of whether a content element 22 is within the range of acceptable content ratings at the content server 12, the device user 30 can be isolated from any information about content elements 22 that are outside the range. For example, a parent can keep their children from any awareness of content elements 22 that are beyond the maturity level of the children or that include information sharing such as location of the device 16 used by a child. Many parents are likely familiar with the idea that once a child sees something, they want it, especially if they are not allowed to have it. In this embodiment, the device user 30 cannot "see" content elements 22 outside of the range.

Once at least the content descriptors are transmitted to the device 16, a determination is made as to whether the device user 30 chooses to purchase (including for no charge) any of the content elements 22 at decision block 54. Purchasing a content element 22 can include, for example, clicking on an icon or content descriptor on the list of content elements 22 that can be shown as part of an application marketplace. Once selected, the content server 12 can perform authentication and/or validation processing on the request for purchase to determine if it is appropriate to try to download the requested content to the device 16. The content server 12 can also determine whether the purchase request is authentic—that is, whether the request emanates from the individual authorized to request downloads of content elements 22 to the device 16. For example, the content server 12 can determine whether the telephone number or IP address assigned to the device 16 is authentic. Alternative or additional validation and authentication mechanisms are also possible. The content server 12 can also perform a financial transaction associated with the requested content element 22 such as charging a payment source that is previously stored at the content server 12 if the purchase requires a payment.

If the device user 30 does not purchase any of the content elements 22 at decision block 54, the process 40 is complete. If the device user 30 does purchase any of the content elements 22 at decision block 54, the content elements 22 purchased can be stored at step 56. Storage of the purchased content elements 22 can be on the device 16. The content elements 22 purchased can also be stored on the content server 12. Storage of the purchased content elements 22 can alternatively be accomplished using a server that is part of a computing cluster whereby the content server 12 and additional servers share resources, such as storage memory, and load balance the processing of requests to the content server 12. Alternatively, storage of the purchased content elements 22 can be accomplished using a cloud computing service, or the cloud. The cloud can include hundreds or thousands of servers configured to provide scalable computing resources. Storing the content elements 22 on the cloud can, for example, allow more than one device 16 to access the content elements 22 under the same purchase. Storing the content elements 22 on the cloud can also allow the content server 12 to automatically make updates to the content elements 22 as the updates are available, for example, upgrades for applications, games, or other content. If a device user 30 has multiple devices 16, for example a parent with children each having a device 16, storing a content element 22 on the cloud could allow the parent's and children's devices 16 to access the content element 22 without making separate purchases.

Once content elements 22 are stored in step 56, a determination can be made as to whether the device user 30 attempts to access a stored content element 22 at decision block 58. If the device user 30 does not attempt to access a stored content element 22, the process 40 ends. If the device user 30 does attempt to access a stored content element 22, the content server 12 can identify whether the content rating has changed for the content element 22 since it was purchased at step 60. If a determination is made at decision block 62 that the content rating of the content element 22 being accessed by the device user 30 has not changed, the process 40 ends and the device user 30 can access the stored content element 22. If a determination is made at decision block 62 that the content rating of the stored content element 22 being accessed by the device user 30 has changed, the content server 12 can notify the device user 30 of the change in content rating at step 64. This notification can be an email or text message sent to the device user 30 indicating that a content element 22 previously purchased has a different content rating than when purchased. This notification can, for example, be used by a parent to determine that a content element 22 is no longer appropriate for use by their child because the content rating has changed. The notification can also include steps for a device user 30 to follow to remove the stored content element 22 or restrict access to the stored content element 22 so that it is no longer available for use by at least some devices 16.

FIG. 4 is a logic flowchart of a process 70 performed by the one or more content servers 12 in the system 10. Beginning at step 72, the content server 12 can receive a content rating for a content element 22 from a content provider. In an exemplary embodiment, the content provider can develop a content element 22 such as an application for distribution through an application marketplace, and submit that content element 22 to the content distributor for publication to device users 30. When the content provider submits the application, the content provider can be required to select a content rating from a plurality of content ratings that best matches the maturity level or information sharing present in the content element 22. The content provider can also be, for example, restricted from selecting specific content ratings if information sharing is present in the content element 22.

Once the content element 22 and content rating have been received by the content distributor, the content distributor can review that content rating at step 74. The review provides the content distributor the opportunity to determine whether the content rating for the content element 22 is acceptable at decision block 76. The review can include generating an updated content rating for the content element 22 based on a set of standards the content distributor has established for each content rating or based on whether the content element 22 includes information sharing features. If the content rating from the content distributor is acceptable, e.g. it matches the updated content rating, the content distributor can publish the content element 22 at step 78. Publication can occur, for example, in an application marketplace allowing device users 30 to access the content element 22. If the content rating is not acceptable, the content distributor can revise the content rating to the updated content rating at step 80. In an exemplary embodiment, the content rating can be revised to conform to the set of standards established by the content distributor. If the content distributor revises the content rating to the updated content rating, the content distributor can notify the content provider of the updated content rating at step 82. The content distributor can publish the content element 22 at step 78 once the content rating has been revised.

After the content element 22 is published, the content distributor can set up a mechanism to receive feedback from the device user 30 on the accuracy of the content rating at step 84. The mechanism can allow the device user 30 to, for example, submit a complaint about the content rating for the content element 22. The complaint could include details that the content rating was not accurate for the maturity level of the content element 22. Upon receiving feedback from a device user 30, the content distributor can review the content rating for the content element 22 at step 86. The review provides the content distributor the opportunity to determine whether the content rating for the content element 22 is acceptable at decision block 88. The review can include generating an updated content rating for the content element 22 based on a set of standards the content distributor has established for each content rating or based on whether the content element 22 includes information sharing features. If the content rating from the content distributor is acceptable, e.g. it matches the updated content rating, the content distributor can end the process 70 by leaving the content element 22 published with its current content rating. The content distributor could also notify the device user 30 that submitted feedback about the content element 22 that the content rating is acceptable.

If the content rating of the content element 22 reviewed based on the device user 30 feedback is not acceptable, the content distributor can revise the content rating by implementing the updated content rating at step 90. In a similar manner to step 80, the content rating can be revised to the updated content rating to conform to the set of standards established by the content distributor. If the content distributor revises the content rating based on feedback from the device user 30, the content distributor can notify the device user 30 of the updated content rating at step 92. The content distributor can also offer the device user 30 a refund if a payment was made for the content element 22 and the content rating was not acceptable to the device user 30. The content distributor can also notify the content provider of the updated content rating at step 94, allowing the content distributor to consider revisions to the content element 22 if the original content rating is to be achieved by the content provider. The content distributor can also notify the content provider if the content rating of the content element 22 reviewed is acceptable, allowing for voluntary re-rating by the content provider to better meet device user 30 expectations. Notifications to both the device user 30 and content provider can be based on notification settings chosen by the device user 30 and content provider. Once these notifications are sent in steps 92 and 94, the process 70 is complete.

FIG. 5 is a logic flowchart of a process 100 performed by the one or more content servers 12 in the system 10. Beginning at step 102, the content server 12 can receive a content filter from a device user 30 defining a range of content ratings acceptable for the device 16. The range can include a single content rating. In an exemplary embodiment, the device user 30 can be a parent setting allowable content ratings for content elements 22 visible and accessible on a child's device 16 through an application marketplace. The content filter can allow selection of categories of content ratings for content elements 22 to be visible and accessible on a device 16. For example, the categories can include everyone, low maturity, medium maturity, high maturity, and show all applications. The device user 30 can have the capability of selecting one or more categories for display on the device 16. The device user 30 can also have the capability of protecting the content filter with an authentication mechanism. In an exemplary embodiment, the device user 30 can be a parent with a teenage child who selects the content filter categories everyone, low maturity, and medium maturity but excludes (e.g., does not select for inclusion or affirmatively selects for exclusion) the categories high maturity and show all applications in the content filter for their child's device 16.

After the content filter is received by the content distributor, the content distributor can receive a request to change the content filter from the device user 30 at step 104. Upon receiving a request to change the content filter, the content distributor can determine whether the identity of the device user 30 requesting the change can be authenticated at decision block 106. For example, the authentication mechanism can include requiring the device user 30 to provide a password to change the content filter. Alternative or additional authentication mechanisms are also possible. If the identify of the device user 30 requesting the change to the content filter cannot be authenticated, the content distributor will not change the content filter at step 108 and the process 100 ends. In an alternate embodiment, the content distributor could notify the device user 30 that an unauthenticated attempt to change the content filter was made.

Continuing with the process 100, if the identity of the device user 30 can be authenticated by, for example, the device user 30 providing a password, the content filter can be changed to reflect a different range of content ratings acceptable for the device 16 at step 110. Once the content filter has been changed, the content distributor can notify the device user 30 of the change to the content filter at step 112. The notification to the device user 30 can be made according to notification settings chosen by the device user 30. This notification can, for example, alert a device user 30 with an email or text message that the content filter has been changed. The notification is useful in the case where a child manages to get through the authentication mechanism put in place by a parent and changes the content filter. The process 100 is complete after the notification is sent to the device user 30.

The embodiment of the content server 12 (and the algorithms, methods, instructions etc. stored thereon and/or executed thereby) can be realized in hardware, software, or any combination thereof. The hardware can include, for example, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably.

Further, in one embodiment, the content server 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any tangible device that can, for example, contain, store, communicate, or transport the program for use by or in connection with any processor. The medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for restricting access to a set of content elements with content ratings by a content distributor, comprising:
   receiving a request from a device to access a set of content elements;
   identifying at least a content descriptor and a content rating for each content element within the set of content elements, wherein the respective content rating for the particular content element is dependent on, at least in part, an amount and type of information sharing that the particular content element is configured to perform, wherein the information sharing is at least one of the group consisting of: disclosing an identity of a user, allowing communication between the device user and other device users, and disclosing a location of the device;
   identifying a range within the content ratings;
   identifying content elements with content ratings that are within the range;
   transmitting at least the content descriptors for content elements having content ratings that are within the range to the device for display on the device to permit a device user to access the content elements by content descriptor, wherein at least some content descriptors for content elements having content ratings that are outside of the range are not transmitted to the device;
   receiving a content element with a content rating;
   generating an updated content rating for the content element; and
   revising the content rating to the updated content rating.

2. The method of claim 1, wherein the content element with the content rating is received from a content provider.

3. The method of claim 2 further comprising notifying the content provider if the updated content rating is different from the content rating from the content provider.

4. The method of claim 2 further comprising notifying the content provider if the updated content rating is the same as the content rating from the content provider.

5. The method of claim 2 further comprising prohibiting the content provider from providing specific content ratings for content elements when information sharing features are present in the content elements.

6. The method of claim 1 wherein identifying a range of content ratings comprises receiving a content filter from the device user defining the desired range of content ratings to be displayed by the device.

7. The method of claim 1 further comprising:
   receiving feedback from the device user on the accuracy of the content rating for a content element accessed by the device, and wherein
   generating an updated content rating for the content element is based on the feedback received from the device user.

8. The method of claim 7 further comprising notifying the device user if the updated content rating is different from the content rating from the content provider.

9. The method of claim 7 further comprising notifying the device user if the updated content rating is the same as the content rating from the content provider.

10. The method of claim 8 wherein notifying the device user includes complying with notification settings created by the device user.

11. The method of claim 6 further comprising: receiving a request to change the content filter from the device user;
   authenticating the identity of the device user sending the request to change the content filter; and
   changing the range of content ratings.

12. The method of claim 1 further comprising permitting the device user to purchase the content elements using the content descriptors transmitted to the device during an initial purchase transaction.

13. The method of claim 12 further comprising storing the purchased content elements.

14. The method of claim 13 further comprising:
   receiving a request from the device to access the stored content elements;
   identifying whether the content ratings of the stored content elements have changed from time of purchase; and
   notifying the device user of any changes to the content ratings of the stored content elements.

15. A system for restricting access to a set of content elements with content ratings by a content distributor, comprising
   a content server in communication with a network, wherein the network is in communication with a device; the content server including:
   a processor for controlling the operations of the content server; and a memory for storing data and program instructions used by the processor wherein the processor is configured to execute instructions stored in the memory to:

receive a request from the device to access a set of content elements;

identify at least a content descriptor and a content rating for each content element within the set of content elements, wherein the respective content rating for a particular content element is dependent on, at least in part, an amount and type of information sharing that the particular content element is configured to perform, wherein the information sharing is at least one of the group consisting of: disclosing an identity of a user, allowing communication between the device user and other device users, and disclosing a location of the device;

identify a range within the content ratings;

identify content elements with content ratings that are within the range;

transmit at least the content descriptors for content elements having content ratings that are within the range to the device for display on the device to permit a device user to access the content elements by content descriptor, wherein content descriptors for content elements having content ratings that are outside the range are not transmitted to the device;

receive a content element with a content rating;

generate an updated content rating for the content element; and revise the content rating to the updated content rating.

16. The system of claim 15, wherein the content element with the content rating is received from a content provider, and further comprising:

notifying the content provider if the updated content rating is different than the content rating from the content provider.

17. The system of claim 16 further comprising prohibiting the content provider from providing specific content ratings for content elements when information sharing features are present in the content elements.

18. The system of claim 15 further comprising:

receiving feedback from the device user on the accuracy of the content rating for a content element accessed by the device, and wherein generating an updated content rating for the content element is based on the feedback received from the device user; and notifying the device user if the updated content rating is different from the content rating from the content provider.

19. The system of claim 15 further comprising:

permitting the device user to purchase the content elements using the content descriptors transmitted to the device during an initial purchase transaction; and storing the purchased content elements.

20. The system of claim 19 further comprising:

receiving a request from the device to access the stored content elements;

identifying whether the content ratings of the stored content elements have changed from time of purchase; and notifying the device user of any changes to the content ratings of the stored content elements.

21. A method for a device to restrict access to a set of content elements with content ratings, comprising:

sending a request to a content server to access a set of content elements, wherein the content server:

identifies at least a content descriptor and a content rating for each content element within the set of content elements, wherein the respective content rating for a particular content element is dependent on, at least in part, an amount and type of information sharing that the particular content element is configured to perform, wherein the information sharing is at least one of the group consisting of: disclosing an identity of a user, allowing communication between the device user and other device users, and disclosing a location of the device;

identifies a range within the content ratings;

identifies content elements with content ratings that are within the range; and transmits at least the content descriptors for content elements having content ratings that are within the range to the device for display on the device;

receiving at least some content descriptors wherein at least some content descriptors for content elements having content ratings that are outside of the range are not received by the device;

rendering the received content descriptors on a display on the device;

accessing at least one content element by content descriptor;

sending feedback to the content server on the accuracy of the content rating for a content element accessed by the device, wherein the content server:

generates an updated content rating for the content element;

revises the content rating to the updated content rating;

sends notification to the device user of the updated content rating; and receiving notification of the updated content rating.

22. The method of claim 21 further comprising:

purchasing at least one content element using the content descriptor rendered on the display during an initial purchase transaction; and storing the at least one purchased content element on the device.

* * * * *